(12) United States Patent
Kim

(10) Patent No.: US 9,010,981 B2
(45) Date of Patent: Apr. 21, 2015

(54) DISPLAY DEVICE HAVING AUXILIARY DISPLAY REGION

(71) Applicant: Samsung Display Co., Ltd., Yongin, Gyeonggi-Do (KR)

(72) Inventor: Yun Jae Kim, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/759,931

(22) Filed: Feb. 5, 2013

(65) Prior Publication Data

US 2014/0085933 A1    Mar. 27, 2014

(30) Foreign Application Priority Data

Sep. 21, 2012    (KR) .................. 10-2012-0105208

(51) Int. Cl.
    *F21V 8/00*      (2006.01)
    *G06F 3/0488*      (2013.01)
    *G06F 1/16*      (2006.01)

(52) U.S. Cl.
CPC ............ *G02B 6/0068* (2013.01); *G02B 6/0011* (2013.01); *G02B 6/002* (2013.01); *G06F 3/04886* (2013.01); *G06F 1/1637* (2013.01)

(58) Field of Classification Search
None
See application file for complete search history.

(56) References Cited

FOREIGN PATENT DOCUMENTS

| KR | 10-2008-0006835 A | 1/2008 |
| KR | 10-2011-0017239 A | 2/2011 |
| KR | 10-2011-0045143 A | 5/2011 |
| KR | 10-2010-0125801 A | 6/2012 |

OTHER PUBLICATIONS

English machine translation of KR 2008-006835 (Dong et al).*

* cited by examiner

*Primary Examiner* — Ashok Patel
(74) *Attorney, Agent, or Firm* — Knobbe Martens Olson & Bear, LLP

(57) ABSTRACT

A display device includes an exterior surface; a main emission region comprising a side edge when viewed in a viewing direction perpendicular to the exterior surface; and an auxiliary emission region next to the side edge when viewed in the viewing direction. The device further includes a light-guide plate disposed in the auxiliary emission region when viewed in the viewing direction; and a first light source disposed adjacent to the light-guide plate and configured to emit light in a first direction to supply the light to the light-guide plate. An imaginary straight line extending from the first light source in the first direction is tilted with respect to the side edge while not crossing the side edge.

22 Claims, 4 Drawing Sheets

DISPLAY DEVICE HAVING AUXILIARY DISPLAY REGION

CROSS-REFERENCE TO RELATED APPLICATION

This application claims priority from Korean Patent Application No. 10-2012-0105208 filed on Sep. 21, 2012 in the Korean Intellectual Property Office, the disclosure of which is incorporated herein by reference in its entirety.

BACKGROUND

1. Field

The present disclosure relates to a display device, and more particularly, to a display device including a main emission region and an auxiliary emission region.

2. Description of the Related Technology

A display device may include a main emission region through which light emitted from a display panel is transmitted to then be externally viewed. The display panel may include a plurality of pixels arranged in a matrix configuration, and may display an image by controlling scales of the respective pixels. The display panel may be an organic electroluminescent display panel, a liquid crystal display panel, an electrophoretic display panel, and other various types of display panels.

The display panel may further include an auxiliary emission region in addition to the main emission region. The auxiliary emission region may include an icon portion to display an icon. The shape of the icon may be defined by the shape of a light transmission region of the auxiliary emission region. The display device can sense an external input using the icon portion by a button pressing method or a touch sensing method, and performs an operation corresponding to the external input. The display panel may further include a light source for supplying light to the auxiliary emission region.

SUMMARY

In a display device, a portion of the light emitted from a light source toward to an auxiliary emission region of a display device may be incident to a main emission region, and gray scales of an image displayed on the display panel though the main emission region may be adversely affected. The quality of the image may be deteriorated.

The present disclosure provides a display device, which can prevent light emitted from a light source for supplying the light to an auxiliary emission region from being incident into a main emission region.

The present disclosure further provides a display device, which can be manufactured with a reduced size.

An aspect of the present invention provides a display device including an exterior surface, a main emission region comprising a side edge when viewed in a viewing direction perpendicular to the exterior surface, an auxiliary emission region next to the side edge when viewed in the viewing direction, a light-guide plate disposed in the auxiliary emission region when viewed in the viewing direction, and a first light source disposed adjacent to the light-guide plate and configured to emit light in a first direction to supply the light to the light-guide plate, wherein an imaginary straight line extending from the first light source in the first direction is tilted with respect to the side edge while not crossing the side edge.

Another aspect of the present invention provides a display device including an exterior surface, a main emission region comprising a side edge when viewed in a viewing direction, an auxiliary emission region next to the side edge when viewed in the viewing direction, a light-guide plate disposed in the auxiliary emission region when viewed in the viewing direction and comprising a first light incidence side surface, and a first light source disposed adjacent to the first light incidence side surface and facing the first light incidence side surface, wherein the first light incidence side surface is tilted with respect to the side edge or an imaginary straight line extending from the side edge.

Yet another aspect of the present invention provides a display device including an exterior surface, a main emission region comprising a side edge when viewed in a viewing direction perpendicular to the exterior surface, an auxiliary emission region next to the side edge when viewed in the viewing direction, first and second light-guide plates disposed in the auxiliary emission region when viewed in the viewing direction, a first light source disposed adjacent to the first light-guide plate and configured to emit light in a first direction to supply the light to the first light-guide plate; and a second light source disposed adjacent to the second light-guide plate and configured to emit light in a second direction to supply the light to the second light-guide plate, wherein an imaginary straight line extending from the first light source in the first direction is tilted with respect to the side edge while not crossing the side edge, and another imaginary straight line extending from the second light source in the second direction is tilted with respect to the side edge while not crossing the side edge.

A further aspect of the present invention provides a display device including an exterior surface, a main emission region comprising a side edge when viewed in a viewing direction perpendicular to the exterior surface, an auxiliary emission region next to the side edge when viewed in the viewing direction, a first light-guide plate disposed in the auxiliary emission region when viewed in the viewing direction and comprising a first light incidence side surface, a second light-guide plate disposed in the auxiliary emission region when viewed in the viewing direction and comprising a second light incidence side surface, a first light source disposed adjacent to the first light incidence side surface and facing the first light incidence side surface; and a second light source disposed adjacent to the second light incidence side surface and facing the second light incidence side surface, wherein the first light incidence side surface and the second light incidence side surface are tilted with respect to the side edge or an imaginary straight line extending from the side edge.

As described above, the embodiments of the present invention provide for the following effects and advantages. The configuration of the embodiments minimizes the transmission of the light supplied to the auxiliary emission region toward the main emission region and the influence of the light to an image displayed on the main emission region. Thus, display quality of the display device is improved. In addition, the display device having a reduced size can be manufactured.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS

Figure 1:
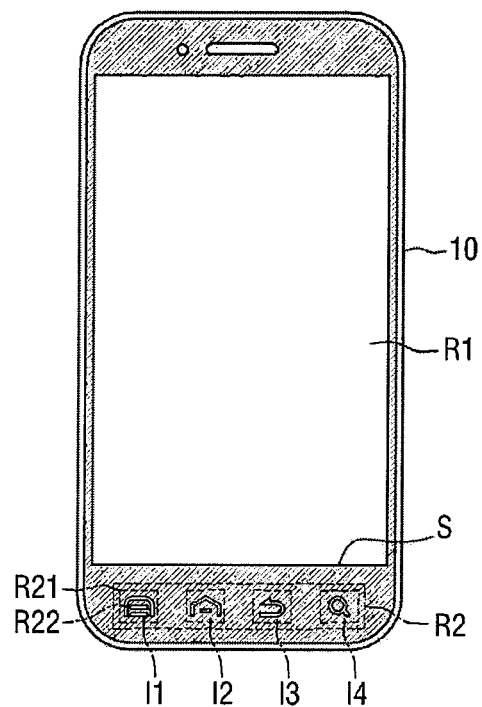
FIG. 1 is a plan view of a display device according to an embodiment of the present invention.

Advantages and features of the present invention and methods of accomplishing the same may be understood more readily by reference to the following detailed description of embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Thus, in some embodiments, well-known structures and devices are not shown in order not to obscure the description with unnecessary detail. Like numbers refer to like elements throughout. In the drawings, the thickness of layers and regions are exaggerated for clarity.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views of the invention. Accordingly, the exemplary views may be modified depending on manufacturing technologies and/or tolerances. Therefore, the embodiments of the invention are not limited to those shown in the views, but include modifications in configuration formed on the basis of manufacturing processes. Therefore, regions exemplified in figures have schematic properties and shapes of regions shown in figures exemplify specific shapes of regions of elements and not limit aspects of the invention.

Hereinafter, embodiments of the present invention will be described in further detail with reference to the accompanying drawings.

FIG. 1 is a plan view of a display device according to an embodiment of the present invention.

Referring to FIG. 1, the display device 1 includes an outer plate including an exterior surface or display surface 10. The display device further includes a main emission region R1 and an auxiliary emission region R2 when viewed in a viewing direction perpendicular to the exterior surface 10.

The main emission region R1 of the outer plate is optically transparent, so that an image displayed on a lower portion of the main emission region R1 of the outer plate can be viewed from the outside of the display device 1 through the main emission region R1 of the outer plate. The display device 1 may include a display panel (not shown) disposed at the lower portion of the main emission region R1 of the outer plate. The display panel may include a plurality of pixels arranged in a matrix configuration, and may display an image by controlling gray scales of the plurality of pixels. The image displayed on the display panel can be externally viewed through the main emission region R1 of the outer plate.

The auxiliary emission region R2 may be disposed next to one side edge S of the main emission region R1 when viewed in the viewing direction. The auxiliary emission region R2 may include a light transmission region R22 and a light blocking region R21 when viewed in the viewing direction. The light blocking region R21 of the outer plate may be formed by applying a light blocking material on the surface 10. The light transmission region R22 may be defined by a region without a light blocking material applied thereon. The light transmission region R22 may have various shapes, and the auxiliary emission region R2 of the outer plate may include first to fourth icons I1, I2, I3 and I4 divided by the shape of the light transmission region R22. While FIG. 1 shows that the auxiliary emission region R2 includes four icons, which is, however, provided only for illustration, and the number of icons included in the auxiliary emission region R2 may vary according to embodiments. The light generated from under the outer plate may be externally viewed through the first to fourth icons I1, I2, I3 and I4. The display device 1 emits the light to the outside through the first to fourth icons I1, I2, I3 and I4, thereby allowing the operation icons of the display device 1 or the first to fourth icons I1, I2, I3 and I4 to be easily identified. The display device 1 may further include a light source module for supplying light to the first to fourth icons I1, I2, I3 and I4. The light source module may be positioned below the auxiliary emission region R2 of the outer plate. The light source module will later be described in more detail.

The display device 1 may further include a touch sensor (not shown) capable of sensing external input for the auxiliary emission region R2. The display device 1 identifies touch inputs for the first to fourth icons I1, I2, I3 and I4 through the touch sensor and may perform functions corresponding to the first to fourth icons I1, I2, I3 and I4. In some embodiments, the first to fourth icons I1, I2, I3 and I4 may be positioned on buttons, and the display device 1 may sense pressures for the buttons and may perform the functions corresponding to the first to fourth icons I1, I2, I3 and I4, respectively.

Figure 2:
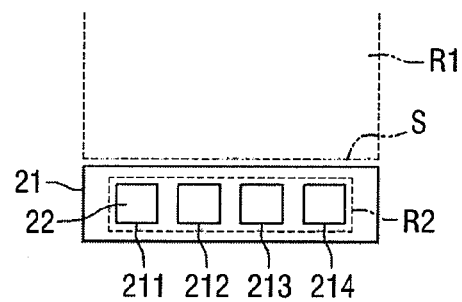
FIG. 2 is a plan view of a light source module according to an embodiment of the present invention.

Hereinafter, a light source module 20 will be described with reference to FIGS. 2 to 4. FIG. 2 is a plan view of a light source module according to an embodiment of the present invention, FIG. 3 is a bottom view of the light source module shown in FIG. 2 and FIG. 4 is a cross-sectional view of the light source module shown in FIG. 3, taken along the line IV-IV'.

Figure 3:
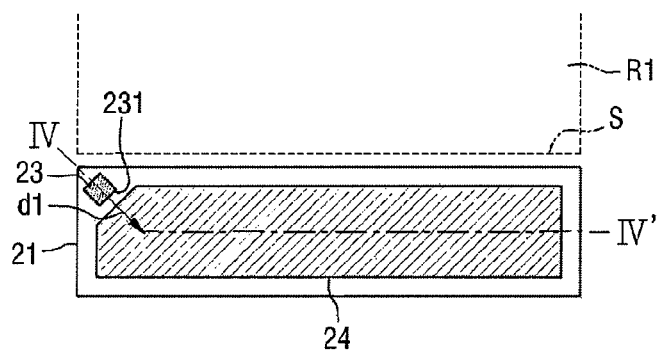
FIG. 3 is a bottom view of the light source module shown in FIG. 2.
Figure 4:
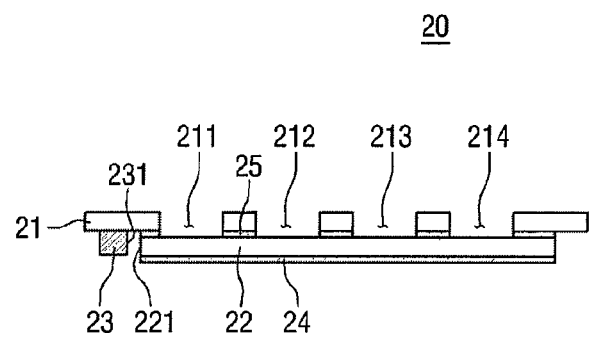
FIG. 4 is a cross-sectional view of the light source module shown in FIG. 3, taken along the line IV-IV'.

Referring to FIGS. 2 to 4, the light source module 20 may include a substrate 21, a light-guide plate 22, a light source 23, a reflection sheet 24 and an adhesive sheet 25.

The substrate 21 may be positioned below the auxiliary emission region R2 of the outer plate having the surface 10. The substrate 21 may be a PCB (printed circuit board (PCB) or a flexible printed circuit board (FPCB), but aspects of the present invention are not limited thereto. Elements for driving the light source 23 or elements for sensing external touch inputs or button inputs for the auxiliary emission region R2 may be placed in the substrate 21.

The substrate 21 may include first to fourth openings 211, 212, 213 and 214. The first to fourth openings 211, 212, 213 and 214 may be disposed under the first to fourth icons I1, I2, I3 and I4, respectively. The light generated from a lower side of the substrate 21 may reach the first to fourth icons I1, I2, I3 and I4 through the first to fourth openings 211, 212, 213 and 214, respectively.

The light-guide plate 22 may be positioned at a lower portion of the substrate 21. A portion of the light-guide plate 22 may be exposed to an upper side of the substrate 21 through the first to fourth openings 211, 212, 213 and 214. The light-guide plate 22 receives the light generated from the light source 23, disperses and emits the same through the upper surface of the light-guide plate 22. The emitted light is transmitted through the first to fourth openings 211, 212, 213 and 214.

The light-guide plate 22 includes a light incidence side surface 221 through which the light generated from the light source 23 is incident into the light-guide plate 22. The light incidence surface 221 is positioned on a side of the light-guide plate 22. The light incidence surface 221 may be disposed to be adjacent to one end of the side edge S. The light incidence surface 221 may be disposed to face the light source 23. The light incidence surface 221 may be tilted to the side edge S and a straight line extending from the side edge S while facing the side edge S and the straight line. If the light incidence surface 221 is tilted to the side edge S while facing the side edge S, it is possible to prevent the light emitted from the light source 23 from penetrating into the main emission region R1, thereby improving display quality of an image displayed on the main emission region R1. Therefore, the display device can prevent the light emitted from the light source 23 from penetrating into the main emission region R1 even without a separate blocking member for blocking the light emitted from the light source 23 from penetrating into the main emission region R1, thereby reducing the manufacturing cost and simplifying the manufacturing process. In addition, in the display device according to embodiments of the present invention, the light source 23 is positioned to be an inner side of the display device, compared to a case where the light incidence surface 221 is perpendicular or parallel to the side edge S, thereby reducing a horizontal or vertical width of the display device.

The light source 23 may include an element capable of emitting light. For example, the light source 23 may include a light emitting diode (LED), but aspects of the present invention are not limited thereto. The light source 23 may be positioned on a bottom surface of the substrate 22 and may be electrically connected to the substrate 22. The light source 23 may be disposed to be adjacent to the light incidence surface 221 of the light-guide plate 22. The light source 23 may generate and emit light to supply the light to the light-guide plate 22. The light source 23 may include a light exit surface 231 through which the light is emitted. The light exit surface 231 may emit the light in a first direction d1. The first direction d1 may correspond to an average direction of the light exiting directions from the light exit surface 231. A straight line extending from the light source 23 in the first direction d1 may be tilted to the side edge S and may not cross the side edge S or a straight line extending from the side edge S, as shown in FIG. 2 or 3. In this case, it is possible to prevent the light emitted from the light source 23 from penetrating into the main emission region R1, thereby improving display quality of an image displayed on the main emission region R1. Therefore, the display device can prevent the light emitted from the light source 23 from penetrating into the main emission region R1 even without a separate blocking member for blocking the light emitted from the light source 23 from penetrating into the main emission region R1, thereby reducing the manufacturing cost and simplifying the manufacturing process.

The reflection sheet 24 may be positioned on a bottom surface of the light-guide plate 22. The reflection sheet 24 may be attached to the bottom surface of the light-guide plate 22. Since the reflection sheet 24 has a surface facing the bottom surface of the light-guide plate 22, which is made of a material capable of reflecting light, thereby allowing the light emitted to a lower side of the light-guide plate 22 to be reflected toward the inside of the light-guide plate 22. The reflection sheet 24 may have the same shape as the bottom surface of the light-guide plate 22, but aspects of the present invention are not limited thereto.

The adhesive sheet 25 may be positioned between the light-guide plate 22 and the substrate 21. The adhesive sheet 25 may adhere the light-guide plate 22 and the substrate 21 to each other. The adhesive sheet 25 may include openings corresponding to the first to fourth openings 211, 212, 213 and 214. In some embodiments, a surface of the adhesive sheet 25 facing a top surface of the light-guide plate 22 may be made of a material capable of reflecting light. In this case, it is possible to prevent the light incident into the light-guide plate 22 from being absorbed or emitted through the substrate 21, thereby improving brightness of the light transmitted to the first to fourth icons I1, I2, I3 and I4. In some embodiments, the adhesive sheet 25 may be replaced by an adhesive agent or may not be used.

Figure 5:
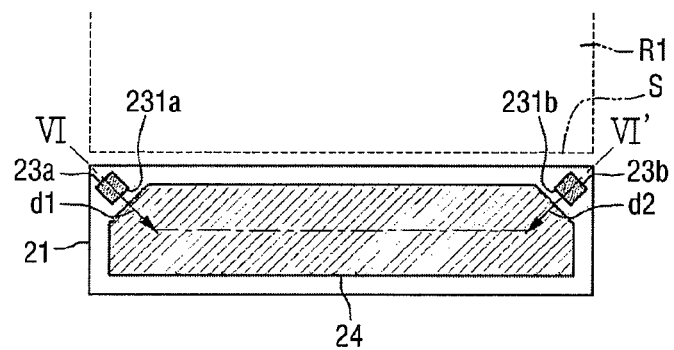
FIG. 5 is a bottom view of a light source module according to another embodiment of the present invention.
Figure 6:
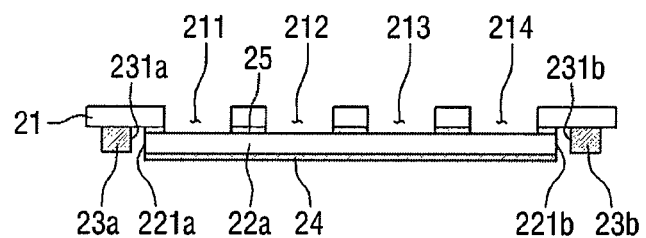
FIG. 6 is a cross-sectional view of the light source module shown in FIG. 5, taken along the line VI-VI'.

Hereinafter, another embodiment of the present invention will be described with reference to FIGS. 5 and 6. FIG. 5 is a bottom view of a light source module according to another embodiment of the present invention and FIG. 6 is a cross-sectional view of the light source module shown in FIG. 5, taken along the line VI-VI'. The plan view of the light source module according to another embodiment of the present invention is substantially the same as that of FIG. 2.

Referring to FIGS. 5 and 6, a light source module 20a may include a substrate 21, a light-guide plate 22a, a first light source 23a, a second light source 23b, a reflection sheet 24 and an adhesive sheet 25.

The light-guide plate 22a may include first and second light incidence side surfaces 221a and 221b formed on its sides. The first light incidence surface 221a may be disposed adjacent to and facing the first light source 23a, and the second light incidence surface 221b may be disposed adjacent to and facing the second light source 23b. The light emitted from the first light source 23a may be incident into the light-guide plate 22a through the first light incidence surface 221a. The light emitted from the second light source 23b may be incident into the light-guide plate 22a through the second light incidence surface 221b. The first light incidence surface 221a and the second light incidence surface 221b may be tilted to side edge S or a straight line extending from the side edge S while facing the side edge S and the straight line. If the first and second light incidence surfaces 221a and 221b are tilted to the side edge S while facing the side edge S, it is possible to prevent the light emitted from the first and second light sources 23a and 23b from penetrating into a main emission region R1, thereby improving display quality of an image displayed on the main emission region R1. Therefore, the display device can prevent the light emitted from the first and second light sources 23a and 23b from penetrating into the main emission region R1 even without a separate blocking member for blocking the light emitted from the first and second light sources 23a and 23b from penetrating into the main emission region R1, thereby reducing the manufacturing cost and simplifying the manufacturing process. In addition, in the display device according to embodiments of the present invention, the first and second light sources 23a and 23b are positioned to inner side of the display device 1, compared to a case where the light incidence surface 221 is perpendicular or parallel to the side edge S, thereby reducing a horizontal or vertical width of the display device. Further, the light source module 20a, including first and second light incidence surfaces 231a and 231b, can emit light relatively uniformly to top surfaces of first to fourth openings 211, 212, 213 and 214, compared to the light source module 20a including a single light incidence surface.

The first and second light sources 23a and 23b may be disposed to be adjacent to the first and second light incidence surfaces 221a and 221b of the light-guide plate 22a. The first and second light sources 23a and 23b may generate and emit light to supply the light to the light-guide plate 22a. The first and second light sources 23a and 23b may include first and second light exit surfaces 231a and 231b each emitting light, respectively. The first and second light exit surfaces 231a and 231b may emit light in first and second directions d1 and d2, respectively. The first and second directions d1 and d2 may correspond to average directions of the light exiting directions from the first and second light exit surfaces 231a and 231b. A straight line extending from the first light source 23a in the first direction d1 may be tilted to the side edge S and may not cross the side edge S or a straight line extending from the side edge S, as shown in FIG. 2 or 5. A straight line extending from the second light source 23b in the second direction d2 may be tilted to the side edge S and may not cross the side edge S or the straight line extending from the side edge S, as shown in FIG. 2 or 5. In this case, it is possible to prevent the light emitted from the first and second light sources 23a and 23b from penetrating into the main emission region R1, thereby improving display quality of an image displayed on the main emission region R1. Therefore, the display device can prevent the light emitted from the first and second light sources 23a and 23b from penetrating into the main emission region R1 even without a separate blocking member for blocking the light emitted from the first and second light sources 23a and 23b from penetrating into the main emission region R1, thereby reducing the manufacturing cost and simplifying the manufacturing process. Explanations of the other components of the display device according to this embodiment are substantially the same as those of the corresponding components shown in FIGS. 2 to 4, and repeated descriptions thereof will be omitted.

Figure 7:
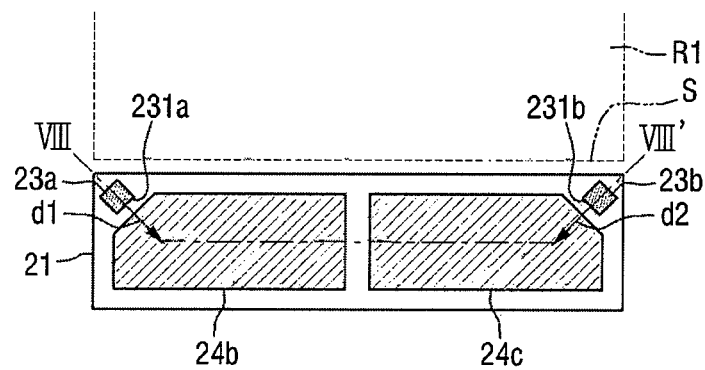
FIG. 7 is a bottom view of a light source module according to still another embodiment of the present invention.
Figure 8:
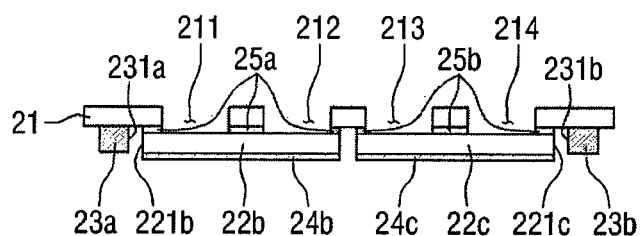
FIG. 8 is a cross-sectional view of the light source module shown in FIG. 7, taken along the line VIII-VIII'.

Hereinafter, still another embodiment of the present invention will be described with reference to FIGS. 7 and 8. FIG. 7 is a bottom view of a light source module according to still another embodiment of the present invention and FIG. 8 is a cross-sectional view of the light source module shown in FIG. 7, taken along the line VIII-VIII'. The plan view of the light source module according to still another embodiment of the present invention is substantially the same as that of FIG. 2.

Referring to FIGS. 7 and 8, a light source module 20b may include a substrate 21, a first light-guide plate 22b, a second light-guide plate 22c, a first light source 23a, a second light source 23b, a first reflection sheet 24a, a second reflection sheet 24b, a first adhesive sheet 25a and a second adhesive sheet 25b.

The first and second light-guide plates 22b and 22c may include, first and second light incidence side surfaces 221b and 221c formed at sides thereof, respectively. The first light incidence surface 221b may be disposed to be adjacent to the first light source 23a, while the second light incidence surface 221c may be disposed to face the second light source 23b. The light emitted from the first light source 23a may be incident into the first light-guide plate 22b through the first light incidence surface 221b. The light emitted from the second light source 23b may be incident into the second light-guide plate 22b through second light incidence surface 221c. The first light incidence surface 221b and the second light incidence surface 221c may be tilted to side edge S or a straight line extending from the side edge S while facing the side edge S or the straight line extending from the side edge S.

The light source module 20b, including the first and second light-guide plates 22b and 22c and the first and second light sources 23a and 23b, control the light irradiated into first to fourth icons I1, I2, I3 and I4 by two groups. For example, the light source module 20b may separately control the light irradiated into icons supplied with light from the first light-guide plate 22b and icons supplied with light from the second light-guide plate 22c. While FIGS. 7 and 8 show that the light source module 20b includes two light-guide plates, the number of light-guide plates may vary according to embodiments. For example, the light source module 20b may include as many light-guide plates as icons included in the auxiliary emission region R2 of the outer plate.

The first and second reflection sheets 24b and 24c may be positioned on bottom surfaces of the first and second light-guide plates 22b and 22c, respectively. The first and second reflection sheets 24b and 24c may have the same shapes as the first and second light-guide plates 22b and 22c, but aspects of the present invention are not limited thereto.

Each of the first and second adhesive sheets 25a and 25b may be positioned between each of the first and second light-guide plates 22b and 22c and the substrate 21. Each of the first and second adhesive sheets 25a and 25b may adhere each of the first and second light-guide plates 22b and 22c to the substrate 21.

Explanations of the other components of the display device according to this embodiment are substantially the same as those of the corresponding components shown in FIGS. 5 and 6, and repeated descriptions thereof will be omitted.

Figure 9:
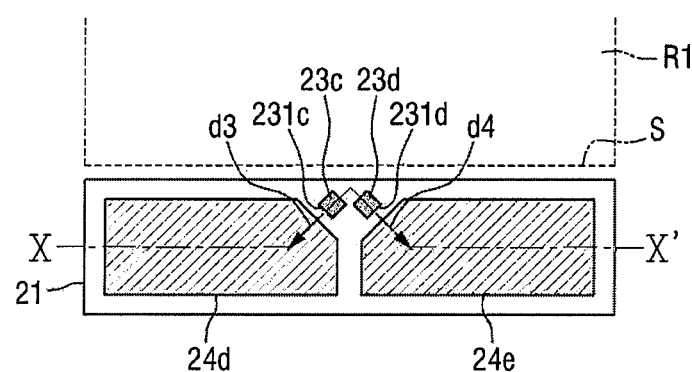
FIG. 9 is a bottom view of a light source module according to still another embodiment of the present invention.
Figure 10:
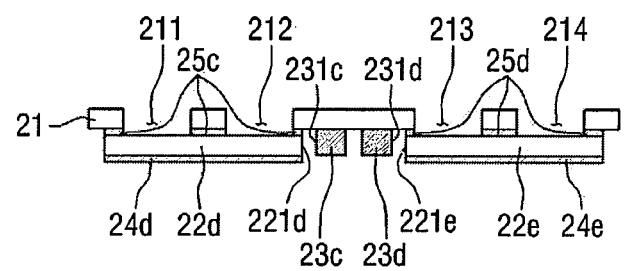
FIG. 10 is a cross-sectional view of the light source module shown in FIG. 9, taken along the line X-X'.

Hereinafter, still another embodiment of the present invention will be described with reference to FIGS. 9 and 10. FIG. 9 is a bottom view of a light source module according to still another embodiment of the present invention, and FIG. 10 is a cross-sectional view of the light source module shown in FIG. 9, taken along the line X-X'. The plan view of the light source module according to still another embodiment of the present invention is substantially the same as that of FIG. 2.

Referring to FIGS. 9 and 10, a light source module 20c may include a substrate 21, a first light-guide plate 22d, a second light-guide plate 22e, a first light source 23c, a second light source 23d, a first reflection sheet 24d, a second reflection sheet 24e, a first adhesive sheet 25c and a second adhesive sheet 25d.

The first and second light-guide plates 22*d* and 22*e* may include first and second light incidence surfaces 221*d* and 221*e* formed at sides thereof, respectively. The first light incidence surface 221*d* may be disposed to be adjacent to the first light source 23*c*, while the second light incidence surface 221*e* may be disposed to face the second light source 23*d*. The light emitted from the first light source 23*c* may be incident into the first light-guide plate 22*d* through the first light incidence surface 221*d*. The light emitted from the second light source 23*d* may be incident into the second light-guide plate 22*d* through second light incidence surface 221*e*. The first light incidence surface 221*d* and the second light incidence surface 221*e* may be tilted to side edge S or a straight line extending from the side edge S while facing the side edge S or the straight line extending from the side edge S. The first light incidence surface 221*d* and the second light incidence surface 221*e* may be disposed to be adjacent to the middle of the side edge S. If the first light incidence surface 221*d* and the second light incidence surface 221*e* are disposed to be adjacent to the middle of the side edge S, the first and second light sources 23*c* and 23*d* are disposed to be adjacent to the middle of the side edge S, thereby easily reducing a horizontal or vertical width of the display device.

The first and second light sources 23*c* and 23*d* may be disposed to be adjacent to the first and second light incidence surfaces 221*d* and 221*e*, respectively. The first and second light sources 23*c* and 23*d* may include first and second light exit surfaces 231*c* and 231*d* each emitting light, respectively. Each of the first and second light exit surfaces 231*c* and 231*d* may emit light in each of first and second directions d3 and d4. The first and second directions d1 and d2 may correspond to average directions of the light exiting directions from the first and second light exit surfaces 231*c* and 231*d*. A straight line extending from the first light source 23*c* in the first direction d3 may be tilted to the side edge S and may not cross the side edge S or a straight line extending from the side edge S, as shown in FIG. 2 or 9. A straight line extending from the second light source 23*d* in the second direction d4 may be tilted to the side edge S and may not cross the side edge S or the straight line extending from the side edge S, as shown in FIG. 2 or 9. The first and second light sources 23*c* and 23*d* may be disposed to be adjacent to the middle of the side edge S. If the first and second light sources 23*c* and 23*d* are disposed to be adjacent to the middle of the side edge S, thereby easily reducing a horizontal width of the display device.

The first and second reflection sheets 24*d* and 24*e* may be positioned on bottom surfaces of the first and second light-guide plates 22*d* and 22*e*, respectively. The first and second reflection sheets 24*d* and 24*e* may have the same shapes as the first and second light-guide plates 22*d* and 22*e*, but aspects of the present invention are not limited thereto.

Each of the first and second adhesive sheets 25*c* and 25*d* may be positioned between each of the first and second light-guide plates 22*d* and 22*e* and the substrate 21. Each of the first and second adhesive sheets 25*c* and 25*d* may adhere each of the first and second light-guide plates 22*d* and 22*e* to the substrate 21.

Explanations of the other components of the display device according to this embodiment are substantially the same as those of the corresponding components shown in FIGS. 7 and 8, and repeated descriptions thereof will be omitted.

While embodiments of the present invention have been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A display device comprising:
an outer plate comprising a primary display surface and an auxiliary display surface next to the primary display surface;
a display panel arranged under the primary display surface;
a light emission module arranged under the auxiliary display surface for lighting the auxiliary display surface;
the light emission module comprising a light source and a light-guide plate; and
the light-guide plate arranged not to overlap the primary display surface when viewing in a direction perpendicular to the primary display surface, and the light source arranged relative to the light-guide plate such that light beams emitted from the light source are primarily directed to the light-guide plate and not directed to the display panel and accordingly not to the primary display surface.

2. The display device of claim 1, further comprising a reflection sheet disposed under the light-guide plate.

3. The display device of claim 1, further comprising a substrate disposed over the light-guide plate.

4. The display device of claim 3, further comprising an icon portion overlapping the auxiliary display surface when viewing in the direction and comprising a light transmission region, and wherein the substrate comprises an opening formed under the icon portion for light from the light-guide plate to pass therethrough.

5. The display device of claim 1, wherein the display panel comprises an array of pixels arranged in a matrix configuration.

6. The display device of claim 1, wherein the light-guide plate comprises a light incidence surface to receive the light emitted from the light source.

7. The display device of claim 6, further comprising a second light source arranged relative to the light-guide plate such that light beams emitted from the second light source are primarily directed to the light-guide plate and not directed to the display panel and accordingly not to the primary display surface.

8. A display device comprising:
an outer plate comprising a primary display surface and an auxiliary display surface next to the primary display surface;
a display panel arranged under the primary display surface;
a light emission module arranged under the auxiliary display surface for lighting the auxiliary display surface, wherein, when viewing in a direction perpendicular to the primary display surface, the light emission module is generally rectangular and having a first edge facing the display panel;
the light emission module comprising a light source and a light-guide plate;
the light-guide plate arranged not to overlap the primary display surface when viewing in the direction, and the light source arranged relative to the light-guide plate such that light beams emitted from the light source are primarily directed to the light-guide plate and not directed to the display panel and accordingly not to the primary display surface;
the light-guide plate comprising a first incidence side surface facing the light source; and the light source arranged such that light beams emitted from the light source would primarily travel to the light-guide plate via the light incidence side surface,
wherein the light incidence side surface is tilted with respect to the first edge when viewing in the direction.

9. The display device of claim 8, further comprising a reflection sheet disposed under the light-guide plate.

10. The display device of claim 8, further comprising a substrate disposed over the light-guide plate.

11. The display device of claim 10, further comprising an icon portion overlapping the auxiliary display surface when viewed in the direction and comprising a light transmission region, and wherein the substrate comprises an opening formed under the icon portion for light from the light-guide plate to pass therethrough.

12. The display device of claim 8, further comprising a second light source arranged relative to the light-guide plate such that light beams emitted from the light source are primarily directed to the light-guide plate and not directed to the display panel and accordingly not to the primary display surface, wherein the light-guide plate further comprises a second light incidence side surface facing the second light source, wherein the second light source is arranged such that light beams emitted from the second light source would primarily travel to the light-guide panel via the second light incidence side surface, and wherein the second light incidence side surface is tilted with respect to the first edge.

13. A display device comprising:
an outer plate comprising a primary display surface and an auxiliary display surface next to the primary display surface;
a display panel arranged under the primary display surface;
a light emission module arranged under the auxiliary display surface for lighting the auxiliary display surface;
the light emission module comprising first and second light sources and first and second light-guide plates;
the first light-guide plate arranged not to overlap the primary display surface when viewing in a direction perpendicular to the primary display surface, and the first light source arranged relative to the first light-guide plate such that light beams emitted from the first light source are primarily directed to the first light-guide plate and not directed to the display panel and accordingly not to the primary display surface; and
the second light-guide plate arranged not to overlap the primary display surface when viewing in the direction, and the second light source arranged relative to the second light-guide plate such that light beams emitted from the light source are primarily directed to the second light-guide plate and not directed to the display panel and accordingly not to the primary display surface.

14. The display device of claim 13, wherein, when viewing in the direction, the light emission module is generally rectangular and having a first edge facing the display panel, wherein the first light source and the second light source are disposed to be adjacent to the middle of the first edge.

15. The display device of claim 13, further comprising at least a reflection sheet disposed under the first and second light-guide plates.

16. The display device of claim 13, further comprising a substrate disposed over the first and second light-guide plates.

17. The display device of claim 16, further comprising an icon portion overlapping the auxiliary display surface when viewing in the direction and comprising a light transmission region, and wherein the substrate comprises an opening formed under the icon portion for light from one of the first and second light-guide plates to pass therethrough.

18. A display device comprising:
an outer plate comprising a primary display surface and an auxiliary display surface next to the primary display surface;
a display panel arranged under the primary display surface;
a light emission module arranged under the auxiliary display surface for lighting the auxiliary display surface, when viewing in a direction perpendicular to the primary display surface, the light emission module is generally rectangular and having a first edge facing the display panel;
the light emission module comprising first and second light sources and first and second light-guide plates;
the first light-guide plate arranged not to overlap the primary display surface when viewing in the direction, and the first light source arranged relative to the first light-guide plate such that light beams emitted from the light source are primarily directed to the first light-guide plate and not directed to the display panel and accordingly not to the primary display surface;
the second light-guide plate arranged not to overlap the primary display surface when viewing in the direction, and the second light source arranged relative to the second light-guide plate such that light beams emitted from the light source are primarily directed to the second light-guide plate and not directed to the display panel and accordingly not to the primary display surface;
the first light-guide plate comprising a first light incidence side surface facing the first light source;
the second light-guide plate comprising a second light incidence side surface facing the second light source;
the first light source arranged such that light beams emitted from the first light source would primarily travel to the light-guide panel via the first light incidence side surface; and
the second light source arranged such that light beams emitted from the second light source would primarily travel to the light-guide panel via the second light incidence side surface,
wherein the first light incidence side surface and the second light incidence side surface are tilted with respect to the first edge when viewing in the direction.

19. The display device of claim 18, wherein the first light incidence side surface and the second light incidence side surface are disposed adjacent to the middle of the first edge.

20. The display device of claim 18, further comprising:
a substrate disposed over the first and second light-guide plates; and
an icon portion overlapping the auxiliary display surface when viewed in the direction and comprising a light transmission region, and wherein the substrate includes an opening formed under the icon portion for light from one of the first and second light-guide plates to pass therethrough.

21. The display device of claim 1, wherein, when viewing in the direction, the light emission module is generally rectangular and having a first edge facing the display panel, wherein the light source is located at a corner of the generally rectangular light emission module adjacent the first edge.

22. The display device of claim 21, wherein the light-guide plate comprises a light-receiving surface that is substantially tilted relative to the first edge when viewing in the direction, wherein the light-receiving surface faces and opposes the light source, and the light source is oriented such that light beams emitted from the light source would primarily travel to the light-guide panel via the light-receiving surface.

* * * * *